(12) United States Patent
Friedrichs et al.

(10) Patent No.: US 7,136,388 B2
(45) Date of Patent: Nov. 14, 2006

(54) CLOCK SYNCHRONIZATION SYSTEM AND METHOD FOR USE IN A SCALABLE ACCESS NODE

(75) Inventors: Eric Friedrichs, Sebastopol, CA (US); Bracy James Blackburn, Garland, TX (US)

(73) Assignee: Alcatel, Paris (FR)

( * ) Notice: Subject to any disclaimer, the term of this patent is extended or adjusted under 35 U.S.C. 154(b) by 1050 days.

(21) Appl. No.: 10/185,561

(22) Filed: Jun. 27, 2002

(65) Prior Publication Data

US 2004/0001516 A1    Jan. 1, 2004

(51) Int. Cl.
*H04J 3/06* (2006.01)

(52) U.S. Cl. .................. 370/395.62; 370/503; 375/354

(58) Field of Classification Search ................ 370/508, 370/395.62, 395.51
See application file for complete search history.

(56) References Cited

U.S. PATENT DOCUMENTS

| | | | |
|---|---|---|---|
| 5,119,370 A | 6/1992 | Terry | |
| 5,237,565 A | 8/1993 | Henrion et al. | |
| 5,287,355 A | 2/1994 | Takahashi et al. | |
| 5,483,539 A * | 1/1996 | Kaufmann | 370/509 |
| 5,734,656 A | 3/1998 | Prince et al. | |
| 5,862,136 A | 1/1999 | Irwin | |
| 5,870,441 A * | 2/1999 | Cotton et al. | 375/354 |
| 5,889,773 A | 3/1999 | Stevenson, III | |
| 5,896,382 A | 4/1999 | Davis et al. | |
| 5,926,479 A | 7/1999 | Baran | |
| 6,370,159 B1 | 4/2002 | Eidson | |
| 6,966,009 B1 * | 11/2005 | Boduch | 713/500 |
| 6,975,610 B1 * | 12/2005 | Van Der Tuijn et al. | 370/335 |
| 7,000,031 B1 * | 2/2006 | Fischer et al. | 709/248 |
| 2002/0093590 A1 * | 7/2002 | Hodgkiss et al. | 348/500 |

FOREIGN PATENT DOCUMENTS

| | | |
|---|---|---|
| EP | 1 111 855 A | 6/2001 |
| WO | WO 00/11880 A2 | 3/2000 |

* cited by examiner

*Primary Examiner*—Huy D. Vu
*Assistant Examiner*—Roberta A. Shand
(74) *Attorney, Agent, or Firm*—Danamraj & Youst, P.C.; Bobby D. Slaton; V. Lawrence Sewell

(57) ABSTRACT

A clock synchronization scheme for use with an access network element having scalable architecture. A point-to-point, high-speed communication link provided between two adjacent banks of the access network element logically interconnects a plurality of banks in a linear stack, thereby creating a stackplane hierarchy for local traffic. A primary bank includes a central master timing and frame alignment control block operable based on a master reference clock. A secondary bank immediately coupled to the primary bank is operable to synchronize its local clock based on a delay preset signal provided by the primary bank. Each remaining secondary bank is operable to synchronize its local clock based on the delay preset signal provided by a local master timing control block disposed in the secondary bank immediately above it.

18 Claims, 8 Drawing Sheets

CLOCK SYNCHRONIZATION SYSTEM AND METHOD FOR USE IN A SCALABLE ACCESS NODE

CROSS-REFERENCE TO RELATED APPLICATION(S)

This application discloses subject matter related to the subject matter disclosed in the following commonly owned patent applications: (i) "Stackplane Architecture," filed Dec. 22, 1999, Ser. No. 09/469,897, in the names of James W. Dove and Paul Franceschini; and (ii) "Scalable Architecture For An Access Node," filed Jun. 27, 2002, Ser. No.: 10/184,386, in the name(s) of Eric Friedrichs, Mark Grimes and Florian Dargeou, which are hereby incorporated by reference herein for all purposes.

BACKGROUND OF THE INVENTION

1. Technical Field of the Invention

The present invention generally relates to telecommunications. More particularly, and not by way of any limitation, the present invention is directed to a clock synchronization system and method for a scalable telecommunications node disposed in an access network.

2. Description of Related Art

The remote access market is undergoing a major metamorphosis. Three factors serve as catalysts for change. The first is the growing number of users, for example, small office/home office (SOHO) users, demanding high performance Internet and remote access for multimedia. Liberalized governmental activity with respect to telecommunications is another factor, which is fostering broader competition through deregulation in local area markets everywhere. The third and final factor is congestion in the Public Switched Telephone Network (PSTN), originally designed and developed for voice-only traffic.

There have been several important advances in telecommunications technology that enable high rates of throughput in carrier networks' backbone connections. For example, by implementing Asynchronous Transfer Mode (ATM) networking technology over a Synchronous Optical Network (SONET)/Synchronous Digital Hierarchy (SDH) physical layer, carrier networks can achieve data rates of up to several hundred megabits per second (Mbps). However, efforts to meet the bandwidth demand for remote access have been beset by the limitations of the existing twisted-pair copper cable infrastructure (i.e., access network) provided between a carrier's central office (CO) and a subscriber's remote site, typically referred to as the local loop. In the telecommunications art, these limitations are sometimes collectively described as the "last-mile" problem.

Current access network solutions that attempt to avoid the bottleneck created by the last-mile problem involve the use of fiber optic technology in the local loop also. As with the high-speed carrier networks, the fiber-based local loop infrastructure is typically architected using SONET as the physical layer technology. With recent developments in optical components and related opto-electronics, in addition to improvements in network design, broadband access is now becoming commonplace.

Moreover, coupled with the phenomenal growth in popularity of the Internet, there has been a tremendous interest in using packet-switched network (PSN) infrastructures (e.g., those based on Internet Protocol (IP) addressing) as a replacement for the existing circuit-switched network (CSN) infrastructures used in today's telecommunications networks. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Accordingly, a new breed of service-centric networks (distinct from the existing voice-centric and data-centric networks) are being explored for implementation on what is known as the next-generation network (NGN) infrastructure, where integrated voice/data/video applications may be provisioned using a packet transport over a packet network in an end-to-end transmission path. As alluded to hereinabove, it is believed that using a packet network infrastructure in access networks provides higher transmission efficiency, lower operation and maintenance costs, and a unified access.

Traditional access systems allow accessing a digital local voice switch, such as a Class 5 switch, by extending a plurality of metallic loops and aggregating them in a bundle for efficiently transmitting the time-division multiplexed (TDM) voice traffic. Typically, such access networks are architected using one or more access nodes in a variety of configurations, e.g., point-to-point chains, rings, etc. Each access node itself comprises several channel banks that provide line interfaces servicing a large number of subscribers. In order to be able to meet projected subscriber growth and associated demand for services, the access nodes are typically over-designed in the sense that a high number of channel banks (e.g., upwards of 8 banks or more) are provisioned for each node at the outset. Additionally, the internal architecture of a conventional access node is such that the banks are interconnected in a "star" configuration, with a centralized "head star" bank coupled to a plurality of satellite banks (i.e., a hub-and-spoke arrangement).

Those skilled in the art should recognize that the conventional "full-provisioning" approach to implementing an access network is beset with several disadvantages. First, the up-front cost of setting up the network can be prohibitively high. Moreover, the increased cost structure will be particularly inefficient where only a small number of subscriber lines need to be supported initially, especially in an access node with a star architecture that is not fully populated. In addition, unrelated to the cost structure factors, the implementation of most conventional access nodes is fraught with internal inefficiencies also, as the local data traffic within the node requires unwieldy protocol conversions. Also, the local links for effectuating bank-to-bank communications are not capable of supporting the bandwidth rates necessary to implement value-added, advanced services that can be provisioned in the NGN.

In addition, regardless of whatever architectural advances are implemented in order to address the concerns set forth above, certain timing and frame alignment issues must also be resolved. For instance, switching TDM traffic at DS0 level requires a fairly robust synchronization scheme, especially where massive throughput rates are required, so that data frames that need to be switched are properly aligned to ensure error-free switching. Accordingly, conventional timing and frame alignment schemes employed in an access node today require a large amount of storage because of the inherent latency in having to wait for longer periods before the frames can be aligned at appropriate times. It should be appreciated that such schemes are not only memory-intensive (an expensive proposition), but they also introduce additional delays in the timing chain of the node which negatively impacts the overall throughput of the node. These and other drawbacks are further exacerbated when the interbank cabling issues are also involved.

SUMMARY OF THE INVENTION

Accordingly, the present invention provides a clock synchronization scheme for use with an access network element having a scalable architecture, wherein the various shortcomings and drawbacks of the state-of-the-art timing/alignment schemes set forth above are advantageously overcome. A point-to-point, high-speed communication link provided between two adjacent banks of the access network element logically interconnects a plurality of banks in a linear stack, thereby creating a stackplane hierarchy for local traffic. All interbank communications (i.e., traffic internal to the access node, such as data, inter-processor messaging, timing and synchronization) are carried on the stackplane using modified Synchronous Optical Network (SONET) carrier frames. The payload portion of a frame is mapped to hold different types of data in their native mode, e.g., TDM, ATM, and other traffic types, and the overhead portion includes stackplane control and management information. A primary bank includes a central master timing and frame alignment control block operable based on a master reference clock. A secondary bank immediately coupled to the primary bank is operable to synchronize its local clock based on a delay preset signal provided by the primary bank. Each remaining secondary bank is operable to synchronize its local clock based on the delay preset signal provided by a local master timing control block disposed in the secondary bank immediately above it.

In one aspect, the present invention is directed to a clock synchronization system for use in an access network element having a primary bank and a plurality of secondary banks interlinked via an interbank communication link, e.g., a stackplane interlink set forth above. The clock synchronization system includes a central master timing and frame alignment control block disposed in the primary bank, which central master timing and frame alignment control block operates based on a master reference clock to determine a delay preset with respect to a slave timing and frame alignment control block disposed in a first level secondary bank coupled to the primary bank. For purposes of the present invention, a first level secondary bank is a secondary bank immediately coupled to the primary bank. A local counter is coupled to the slave timing and frame alignment control block disposed in the first level secondary bank, which local counter is operable to generate an adjusted local clock based on the delay preset information received from the central master timing and frame alignment control block. A local master timing and frame alignment control block is also disposed in the first level secondary bank, which local master timing and frame alignment control block operates responsive to the adjusted local clock to determine a delay preset with respect to a slave timing and frame alignment control block disposed in an adjacent secondary bank immediately below the first level secondary bank. In turn, a local counter coupled to the slave timing and frame alignment control block disposed in the adjacent secondary bank is operable to generate an adjusted local clock based on the delay preset received from the first level secondary bank. Likewise, each of the remaining secondary banks includes a slave timing/frame alignment mechanism that is operable to adjust its local clock based on the delay preset information provided by the local master timing/frame alignment mechanism disposed in the secondary bank immediately above it.

In another aspect, the present invention is directed to a clock synchronization method for use in an access network element having a primary bank and a plurality of secondary banks interlinked via a stackplane-based interbank communication link. The method commences by providing a delay preset by a central master timing and frame alignment control block disposed in the primary bank to a slave timing and frame alignment control block disposed in a first level secondary bank coupled to the primary bank. A local clock is generated by a local counter that is coupled to the slave timing and frame alignment control block disposed in the first level secondary bank, wherein the local clock is operable to be adjusted based on the delay preset information received from the central master timing and frame alignment control block. A local master timing and frame alignment control block disposed in the first level secondary bank is synchronized based on the adjusted local clock, which local master timing and frame alignment control block then provides a delay preset to a slave timing and frame alignment control block disposed in an adjacent secondary bank immediately below the first level secondary bank. In turn, a local counter coupled to the adjacent secondary bank's slave timing and frame alignment control block adjusts its local clock based on the delay preset received from the first level secondary bank. Also, a local master timing and frame alignment control block disposed in the adjacent secondary bank is synchronized based on the adjusted local clock therein. The method thus continues to synchronize each of the remaining secondary banks with reference to a local master timing and frame alignment control block disposed in an adjacent secondary block immediately above it.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
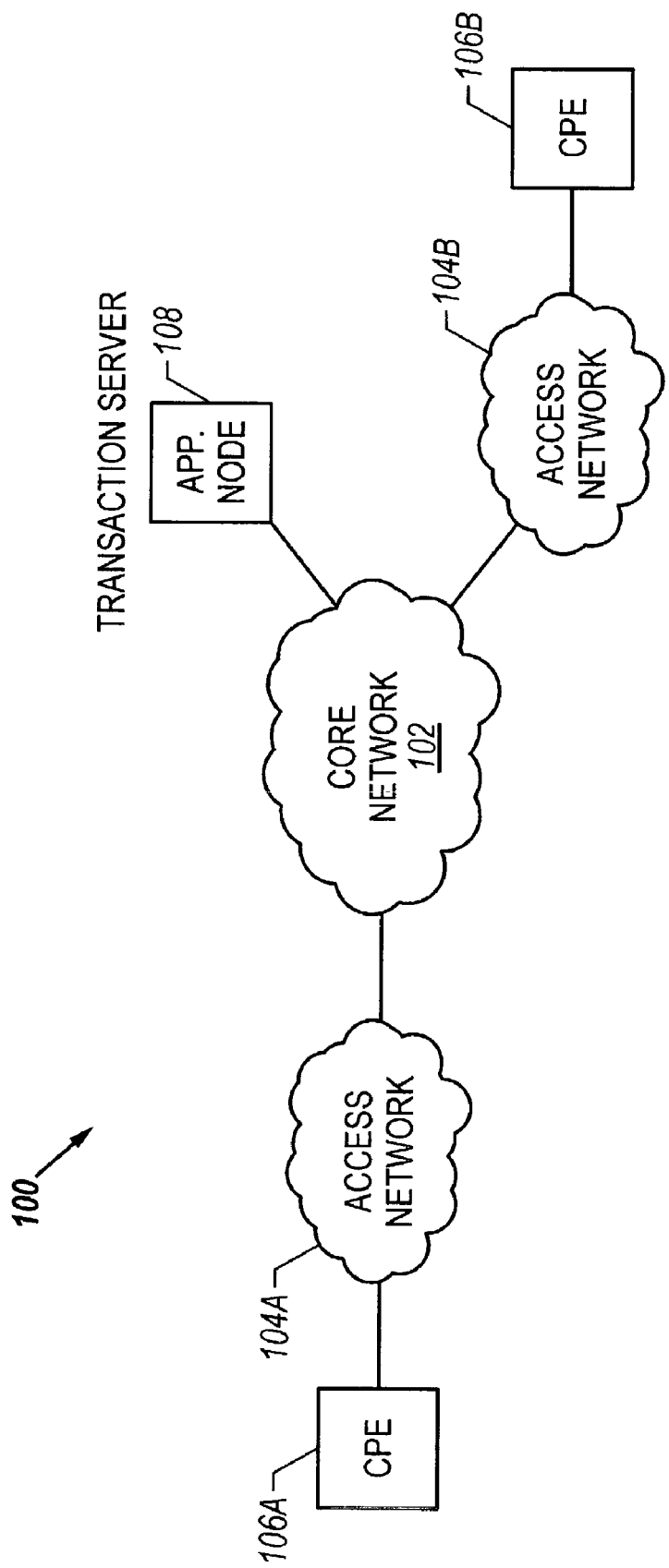
FIG. 1 depicts an exemplary telecommunications network arrangement having an access network portion wherein the teachings of the present invention may be advantageously practiced.

In the drawings, like or similar elements are designated with identical reference numerals throughout the several views thereof, and the various elements depicted are not necessarily drawn to scale. Referring now to FIG. 1, depicted therein is an exemplary network arrangement 100 having one or more access network portions, wherein the teachings of the present invention may be advantageously practiced for providing a scalable architecture for an access network element. The exemplary network arrangement 100, comprising a core transport network 102 and access network portions 104A and 104B, is preferably operable to support telecommunications, data communications, or any combination thereof involving diverse media such as voice, audio, video, graphics, data, and assorted multimedia. The core transport network 102 may be provisioned as a circuit-switched network (CSN), packet-switched network (PSN), or an integrated hybrid network capable of next-generation network (NGN) service infrastructure. In an exemplary embodiment, the Public Switched Telephony Network (PSTN) (for wireline communications), the Public Land Mobile Network (PLMN) (for wireless communications), or any combination thereof may be provided as the CSN. Where the core network 102 is implemented as a packet network, it may preferably be comprised of a network operable with Internet Protocol (IP), Frame Relay, ATM, and/or other applicable technologies.

The access network portions 104A and 104B are disposed between end users (i.e., subscribers) exemplified by customer premises equipment (CPE) 106A, 106B, and the core network 102. It should be appreciated that although isolated CPE units are illustrated in this FIG., they may also be disposed in a private network such as a home area network (HAN), customer premises network (CPN), or a premises distribution network (PDN). Furthermore, the CPE units may be comprised of any known or heretofore unknown Integrated Access Devices (IADs) operable with diverse media. The access network portions 104A, 104B are operable to provide remote access to the subscribers by means of various Point-of-Interface (POI) nodes and Point-of-Presence (POP) nodes interconnected via any suitable wireline, wireless, narrowband, or broadband local network. By way of example, such a local network may be implemented using well known technologies such as the Integrated Services Digital Network (ISDN), Digital Subscriber Line (DSL) and its variants, Fiber In The Loop (FITL) and its variants, Hybrid Fiber/Coaxial (HFC) cable technologies, or Wireless Local Loop (WLL) technologies. Additionally, the exemplary access network portions 104A and 104B may be comprised of a converged local network in further embodiments of the present invention.

Continuing to refer to FIG. 1, reference numeral 108 refers to a transaction server provided as an application node that is exemplary of a service provider operable to provide various telecom, datacom and/or integrated multimedia services to the subscribers. Although the exemplary application node 108 is illustrated as a single isolated node directly coupled to the core network 102, a private network comprising the application node 108, among others, may be provided with its own POI infrastructure in relation to the core network 102.

In a presently preferred exemplary embodiment of the present invention, the access network portion (e.g., access network 104A or 104B) is provided as a fiber-based loop carrier system that can be implemented in various embodiments depending on cost, availability of appropriate local infrastructure, services supported, etc. For example, implementations such as Fiber To The Home (FTTH), Fiber To The Curb (FTTC), Fiber To The Neighborhood (FTTN), and other FITL variants may be architected as a digital loop carrier (DLC) for providing integrated, broadband access services to the subscribers.

Figure 2:
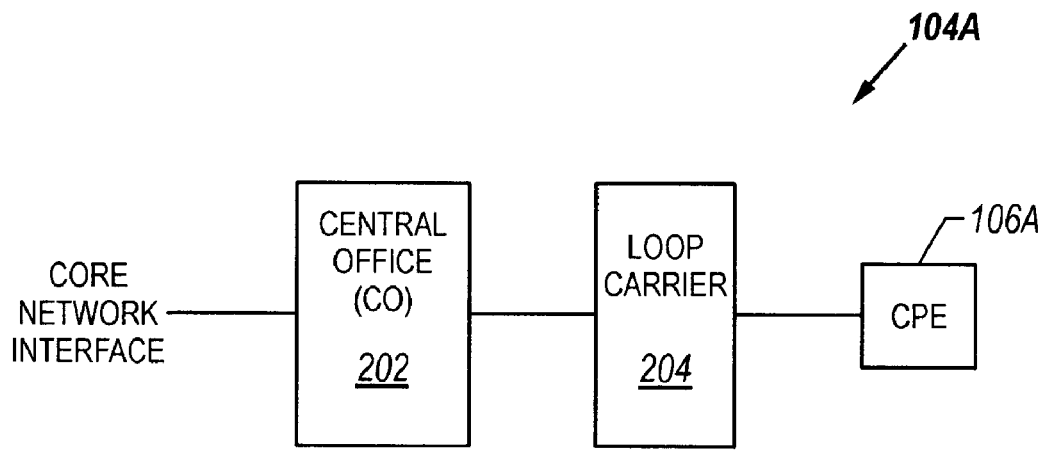
FIG. 2 depicts a high level conceptualization of an access network portion involving a loop carrier in conjunction with a central office.

The fiber-based loop carrier system is preferably at least operable with a suitable physical layer infrastructure such as the Synchronous Optical Network (SONET) technology or its companion, the Synchronous Digital Hierarchy (SDH), which is similar to SONET except that its multiplexing hierarchy is a subset of the SONET multiplexing scheme. FIG. 2 depicts a high level conceptualization of the exemplary access network portion (e.g., access network 104A) involving a loop carrier 204 in conjunction with a central office (CO) 202. An exemplary IAD, for instance CPE 106A, is coupled to the loop carrier 204 that is operable to multiplex the access loop signal between the subscriber equipment and the CO with other loop signals. The POI equipment located at the CO is operable, in turn, to provide interface connectivity to the core transport network.

In accordance with the SONET requirements, the loop carrier 204 is preferably operable with a broad range of Optical Carrier (OC) signals, e.g., OC-3, OC-12, OC-48, et cetera, and the electrical equivalents corresponding thereto, namely, Synchronous Transport Signal (STS)-3, STS-12, STS-48, et cetera. SONET, as the name implies, uses a synchronous transmission scheme, with a SONET frame transmitted every 125 microseconds. Each frame is logically organized as a two-dimensional array of bytes whose size is dependent on the channel rate. The basic SONET channel is an STS-1 (corresponding to OC-1) which consists of frames that have 810 bytes organized in 9 rows by 90 columns. At 8,000 frames per second, this gives a raw channel rate of 51.84 Mbps. Since the overhead for managing SONET line and section equipment consumes 3 of 90 columns (leaving 87 columns of payload, called the Synchronous Payload Envelope or SPE) and the path overhead typically comprises one column, a net user data rate of 49.536 Mbps (86 columns×9 rows×8 bits×8000 frames/second) is available per STS-1 channel.

Data rates higher than STS-1 are obtained by multiplexing multiple STS-1 signals. For example, three STS-1 signals can be byte-interleaved to form an STS-3 signal that operates at 155.52 Mbps. Another form of multiplexing is to concatenate the overhead and payload bytes of multiple STS-1 signals, for example, where an STS-3c frame contains 9 overhead columns and 261 columns for the SPE, giving rise to the data rate of 155.52 Mbps. In the general case, an STS-n frame is an electrical signal having n-tuples of STS-1 frames which, when modulated over an optical carrier, is referred to as an OC-n optical signal.

Transmission rates lower than STS-1 can be obtained by subdividing the payload into what are known as Virtual Tributaries (VTs) which can support data rates from Digital Signal (DS)-1 (operating at 1.544 Mbps) to DS-2 (6.312 Mbps). An STS-1 signal can be logically divided into VTs having separate identities, whereby each VT is operable to carry the same amount of payload through the fiber. Because the data within each VT retains its own ID, it can be easily separated from the rest of the STS-1 signal. Accordingly, where a loop carrier system traverses a number of nodes or sub-nodes (i.e., partitions or shelves within a node) appropriate VTs may be "dropped" at each node/sub-node for processing. VTs are also useful when a SONET-based access network interfaces with another network based on the Pleisochronous Digital Hierarchy (PDH) which is built upon DS-0 (64 Kbps) channels. As will be described in greater detail hereinbelow, a scalable nodal architecture can be advantageously provided by utilizing a SONET-like carrier transport system in accordance with the teachings of the present invention, wherein the add/drop functionality is beneficially implemented within the context of the local (i.e., internal) inter-shelf communications as well.

Figure 3:
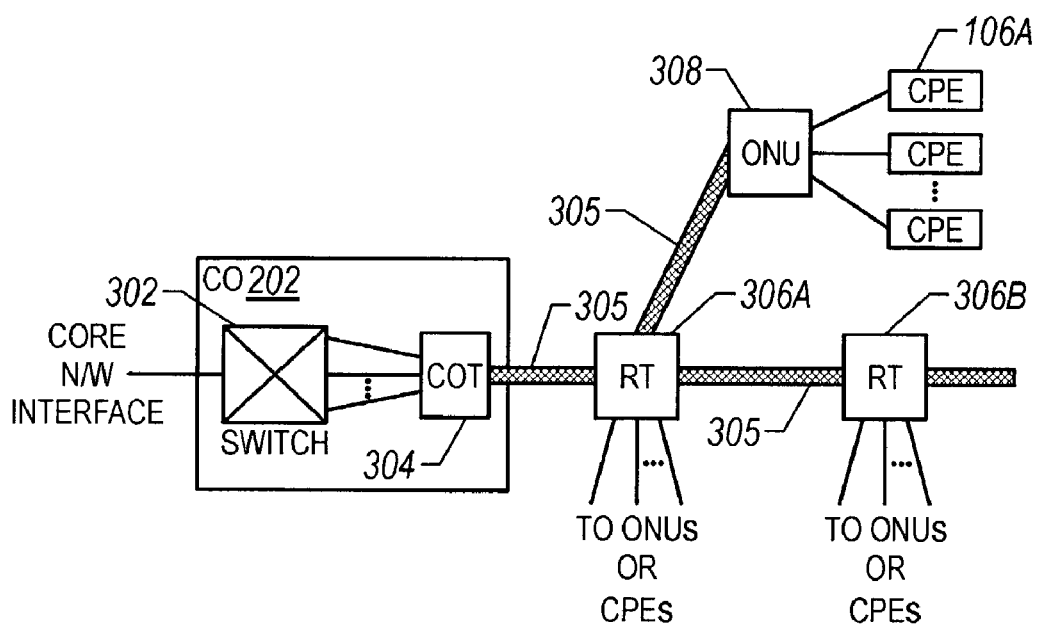
FIG. 3 depicts an exemplary embodiment of a loop carrier system having a plurality of nodes (or, terminals) wherein the scalable architecture of the present invention may be provided in a terminal in accordance with the teachings of the present patent application.

Referring now to FIG. 3, depicted therein is an exemplary embodiment of a fiber-based loop carrier system having a plurality of nodes wherein a scalable inter-shelf architecture may be realized in a node. The loop carrier nodes, which may also be referred to as access network nodes or terminals (more generically, telecommunications nodes), may be organized in one of several topologies for purposes of the present invention and are comprised of two forms depending on their location in the access loop. When co-located at a CO, the loop carrier node is referred to as a central office terminal (COT). Reference numeral 304 exemplifies a COT coupled to a CO switch 302 that forms part of CO 202. Other loop carrier nodes external to the CO are referred to as remote terminals (RTs), e.g., RT 306A and 306B.

Fiber paths 305, preferably operable to carry is signals of OC-3 or higher rates, are used for interconnecting the COT and RTs in a particular topology. Where only one RT is coupled to the COT, the resultant two-node arrangement is referred to as a point-to-point loop carrier system. On the other hand, if multiple RTs are coupled in a linear fashion, either a single feeder multiple RT (MRT) system or a dual feeder MRT system may be obtained. In a single feeder MRT system, the RTs are located on only one side of the COT, as exemplified in this FIG. In the dual feeder MRT system, the RTs are disposed on both sides of the COT, which sides are conventionally referred to as "East" and "West" sides. Accordingly; fiber optic cables emanate from the COT and run in two different directions relative thereto, each branch feeding one or more RTs.

In a further exemplary embodiment, the loop carrier system may be arranged in a ring topology. For example, a unidirectional path switched ring (UPSR) topology is obtained where the westernmost and easternmost nodes of a dual feeder MRT are connected to each other. As a matter of convention, the East direction from the COT carries the communication traffic, whereas the West direction from the COT is provided as the "protect" direction in case there is a failure in the East direction cable (e.g., it is cut) or its performance degrades to a predetermined level.

Regardless of the particular topological configuration used for implementing a DLC, either the COT, RTs, or both may be provided with the capability to concentrate the total access lines connected thereto. That is, the total number of lines to which a terminal is connected may be greater than the maximum number of active lines supported by it. Accordingly, each terminal may have its own concentration ratio (which is the ratio between the total number of connection lines and the maximum number of active lines supported by the terminal).

In addition to the COT and RT access loop nodes, the exemplary loop carrier system may also include other equipment such as Optical Network Units (ONUs) that serve end users that are far enough away from each other that it isn't economical to connect all of them to an RT. The ONUs are operable to convert the signals between electrical and optical domains, if necessary. Also, the ONUs digitize the analog communication signals from a plurality of customers and multiplex them onto a piece of fiber coupled to the RT. In FIG. 3, reference numeral 308 refers to an ONU that is coupled to RT 306A and serves, by way of example, IAD/CPE 106A. Further, an RT in the loop carrier system may be coupled to one or more ONUs and RTs, in addition to the CPEs directly served by the RT.

Figure 4:
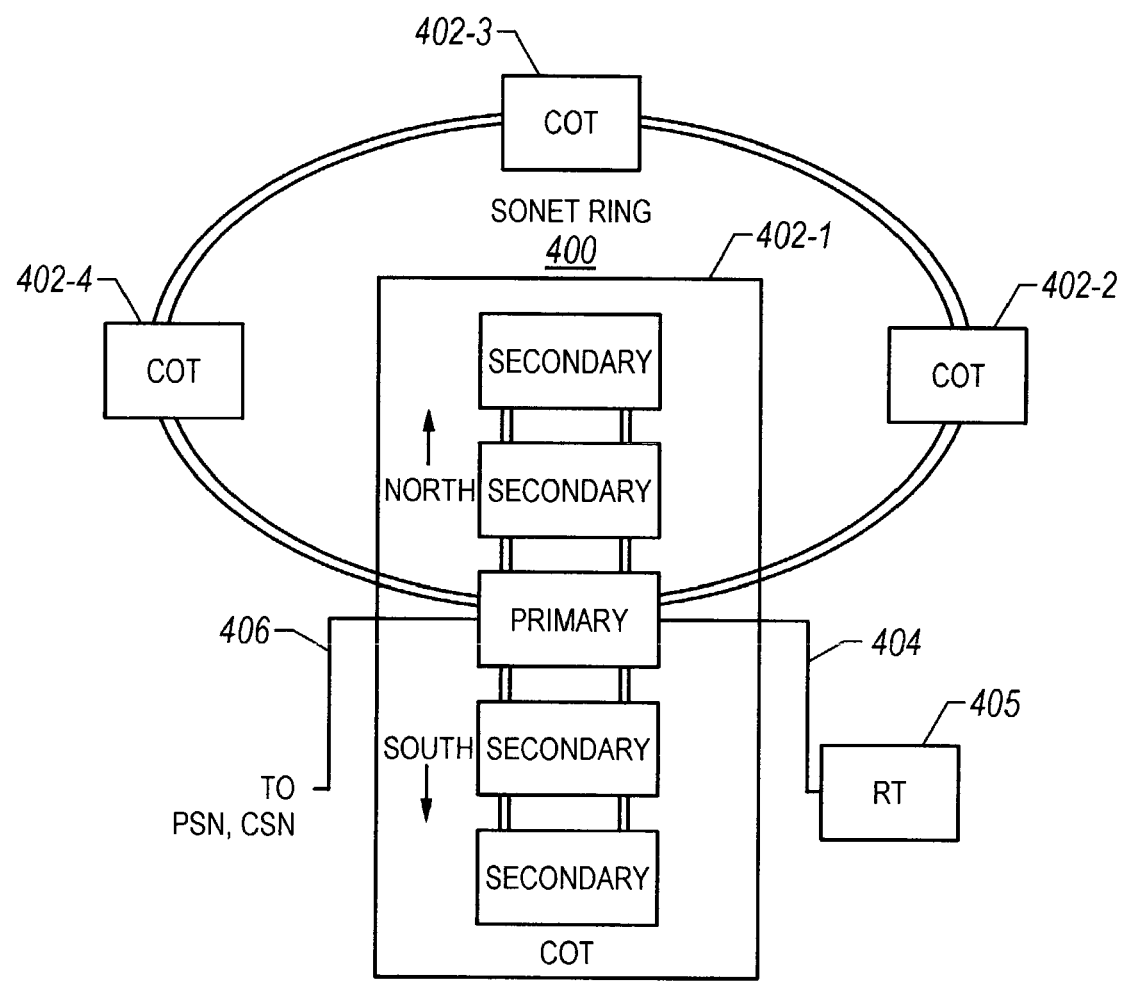
FIG. 4 depicts an exemplary ring topology involving multiple central office terminals (COTs)

FIG. 4 depicts an exemplary SONET ring topology 400 involving multiple terminals. A plurality of COTs 402-1 through 402-4 are connected together in the ring configuration that may be implemented as an UPSR or a bidirectional line switched ring (BLSR). COT 402-1 is particularly exemplified with a plurality of shelves organized in a scalable architecture, wherein the primary shelf is shown with network transport interfaces 406 towards a PSN, CSN, or a combination thereof. A point-to-point SONET link 404 is also exemplified between the primary shelf of COT 402-1 and an RT 405.

Figure 5:
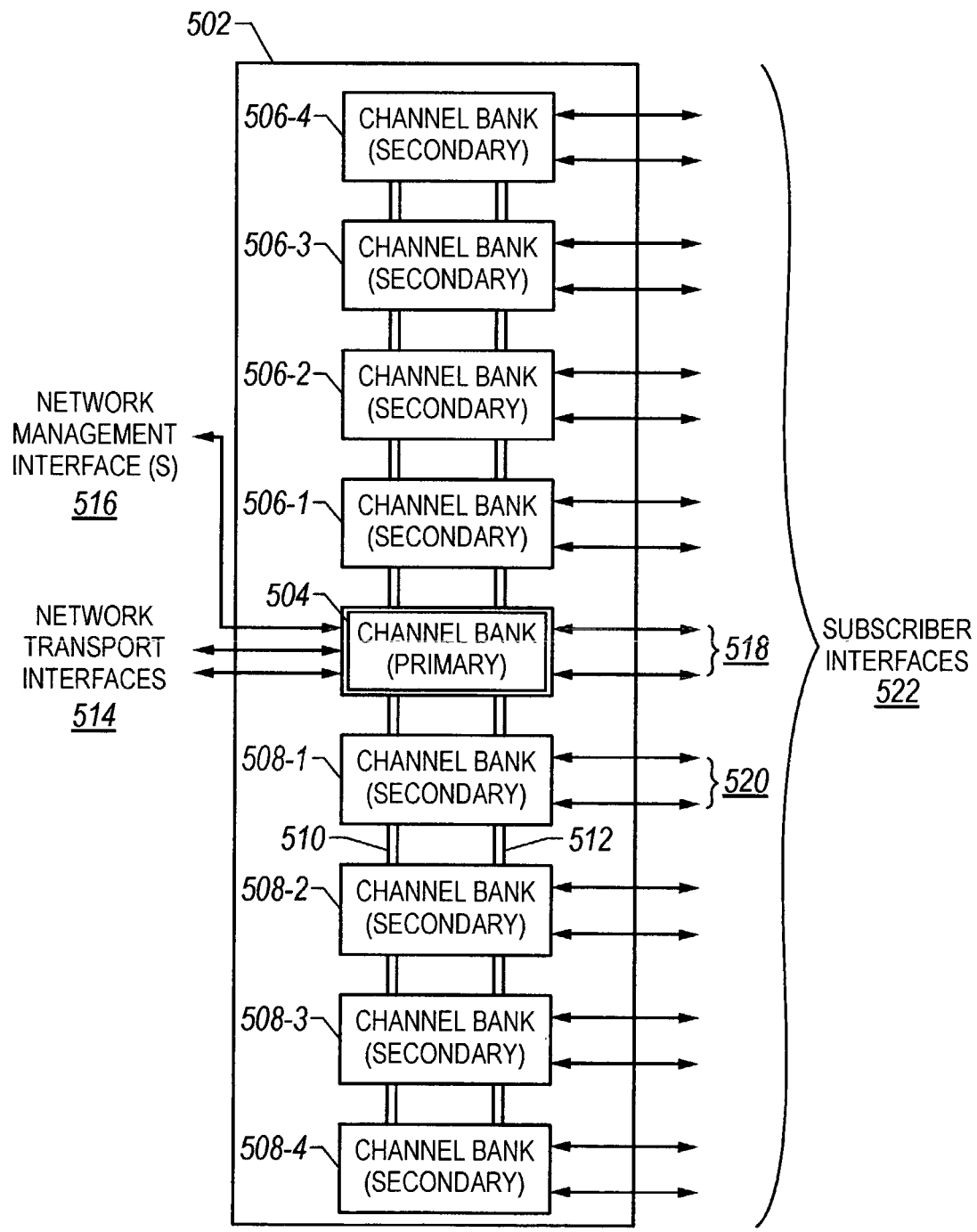
FIG. 5 depicts a high level block diagram of an exemplary access node terminal having a scalable architecture, which terminal may be operable as a COT or as a remote terminal (RT) in an access network.

Referring now to FIG. 5, depicted therein is a high level block diagram of an exemplary access node terminal 502 operable as a COT or an RT in an access network, which terminal is provided with the scalable architecture of the present invention. Preferably, the exemplary terminal 502 is provided as an expandable "linear stack" of a plurality of shelves or channel banks which include a primary shelf 504 and a number of secondary shelves logically disposed both above and below the primary shelf. The various secondary shelves are coupled to the primary shelf 504 via a redundant, bi-directional local communication link that includes appropriate inter-shelf data channel(s) and timing/control channel (s). In FIG. 5, reference numerals 510 and 512 refer to the two redundant local communication links, wherein one is provided to be active while the other is operable as a standby link for effectuating protection switchover. As will be described in greater detail hereinbelow, the local communication links interfacing the adjacent channel banks are provided to be internal to the access node 502 and are architected to carry all the internal, full duplex data channels and timing information in SONET-type carrier frames that are mapped in accordance with the teachings of the present invention to transport the interbank communications. For purposes of the present invention, these local interfaces effectuate a logical communication plane that can be scaled in order to "stack" as many channel banks as are needed and thus may be referred to as a "stackplane" in terms of the internal architecture of the node. Accordingly, the various secondary shelves logically disposed on one side of the primary shelf 504 comprise what may be referred to as the "North" segment of the stackplane. For instance, secondary shelves 506-1 through 506-4 form the North stackplane segment. In similar fashion, secondary shelves 508-1 through 508-4 comprise the "South" segment of the stackplane.

The access node terminal 502 is provided with a plurality of subscriber interfaces 522 to which various IAD/CPEs may be coupled. The subscriber interfaces 522 can include subscriber interfaces 518 associated with the primary shelf 504 as well as subscriber interfaces 520 associated with secondary shelves, e.g., shelf 508-1. On the network side of the terminal, a plurality of transport network interfaces 514 and network management interfaces 516 are provided as part of the primary shelf's interfacing functionality. As alluded to in the foregoing, various transport networks such as a CSN, PSN, or an integrated network may be coupled to the primary channel bank 504 via the interfaces 514.

Figure 6:
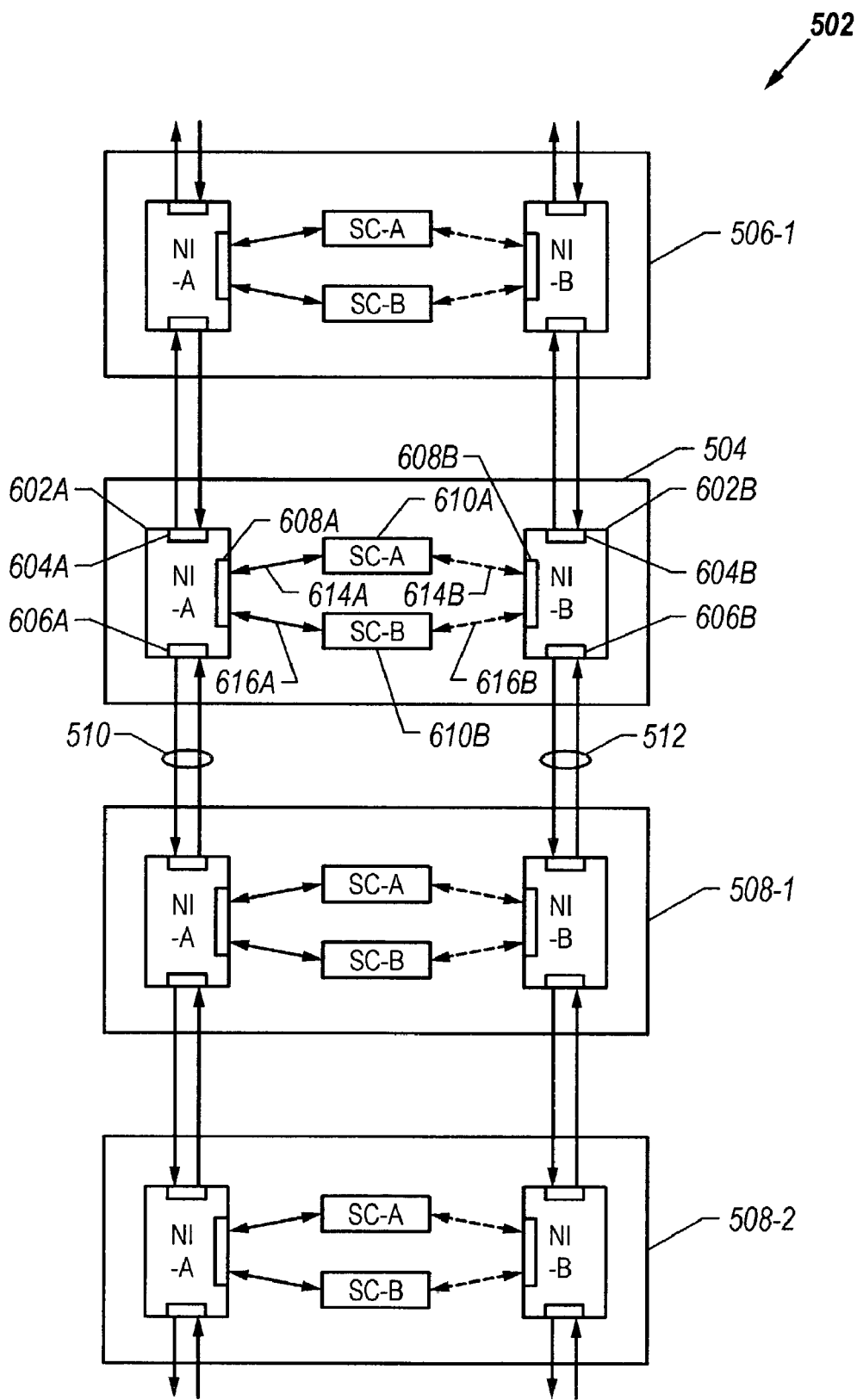
FIG. 6 depicts additional details of the exemplary access node terminal shown in FIG. 5, wherein a primary bank and a plurality of secondary banks are coupled thereto via a stackplane for scalability.

FIG. 6 depicts a functional block diagram of a portion of the access node terminal 502 to illustrate additional details relating to the nodal stackplane architecture provided in accordance with one exemplary embodiment of the present invention. Each channel bank includes a pair of local interface cards for effectuating interbank communication via redundant stackplane links 510 and 512. For purposes of this patent application, these local interface cards are referred to as "node intraface" or NI cards to signify the interbank interfacing. Further, the NI cards may be implemented to be compatible with an optical or electrical medium. In optical implementation, the NI cards are designated as NIO cards. Similarly, the NI cards are designated as NIE cards when implemented to be operable electrically. In a generic way, an NIx card may refer to either an NIO card or an NIE card.

Furthermore, each channel bank is also provided with a pair of cross-connect fabric (XCF) structures implemented as switch cards (SC's). It should be appreciated that dual card implementation is operable to effectuate redundancy protection with respect to switch card failure. Each SC is operable with both NI cards of a bank via full duplex interfaces. When integrated with the bank's NI cards, however, a failure in one of the switch cards in a bank may necessitate a switchover of the node's entire active stackplane link to the standby stackplane link.

Specifically referring now to the primary channel bank 504, various local interfaces for effectuating the redundant stackplane architecture of the access node are described. Reference numerals 602A and 602B refer to the two NI cards (NI-A and NI-B) provided in the primary bank 504. Each NI card includes two stackplane (SP) interfaces (SPIs)—one towards the adjacent bank in one direction (e.g., the North direction) and the other towards the adjacent bank in the other direction (e.g., the South direction). For instance, NI-A card 602A is provided with interface 604A for coupling with the secondary channel bank 506-1 and with interface 606A for coupling with the secondary channel bank 508-1. In similar fashion, NI-B card 602B includes interfaces 604B and 606B for coupling with the secondary channel banks 506-1 and 508-1, respectively.

Further, as alluded to hereinabove, each NI card includes an interface towards the SC pair of the bank. Reference numeral 608A refers to the SC interface of NI-A card 602A towards SC-A 610A (via switch card path 614A) and SC-B 610B (via switch card path 616A) of the primary bank 504. Similarly, NI-B card 602B is provided with interface 608B towards SC-A and SC-B cards, via switch card paths 614B and 616B, respectively.

As set forth in further detail in the following commonly owned co-pending patent application entitled "Scalable Architecture For An Access Node," filed Jun. 27, 2002 Ser. No.: 10/184,386, in the name(s) of Eric Friedrichs, Mark Grimes and Florian Dargeou, which is hereby incorporated by reference herein for all purposes, the stackplane interfaces provided with each channel bank allow any number of secondary banks to be added, in the North or South segments of the stackplane, on an "as-needed" basis so that the DLC nodal infrastructure can be incrementally provisioned or upgraded depending upon subscriber volume and services to be supported. The provision of dual redundancy, in the interbank SP links as well as internal bank switch cards, imparts a high degree of reliability to the access node architecture. In an exemplary configuration of the node at reset/restart, all channel banks may use the default active stackplane (e.g., stackplane-A) and switch cards (e.g., SC-A). When the SC-A of a particular bank fails for some reason, that bank simply switches over to SC-B while the stackplane-A is still maintained for all interbank communications. Thus, it is possible in an evolved configuration of the node to have one or more banks operating with the SC-A and one or more banks operating with the SC-B. If the currently active stackplane fails (due to, e.g., NI-A card failure in a particular bank, a local SP link segment is cut, et cetera), all banks switch to the standby stackplane (i.e., stackplane-B). The banks do not have to change the SC cards, however, where the NI and SC functionalities are not integrated into a single card.

A brief description of the functionality of a generalized subscriber channel bank exemplary of the banks (e.g., primary bank 504 and the plurality of secondary banks coupled thereto) shown in FIGS. 5 and 6 is set forth immediately hereinbelow to provide a setting for the clock and frame alignment synchronization scheme of the present invention. Each exemplary channel bank is preferably provided with a multiplexer for multiplexing various OC-n flows. The combined OC-n flow is forwarded to a DS0 multiplexer or MUX (also referred to as a space switch). Subscriber lines associated with the various CPE units served by the channel banks are coupled to a Time Slot Interchange (TSI) that provides local switching. Each channel bank is provided with a local processor operable to effectuate High level Data Link Control (HDLC) communications via the stackplane by utilizing an Inter-Processor Communication (IPC) band associated therewith. A high-level stackplane interface (SPI) block, generically representative of the NI card interfaces (e.g., interfaces 604A, 606A and 608A) shown in FIG. 6, is operable with respect to each channel bank in order to effectuate (i.e., drive, receive, and convert) the various communication channels as part of the interbank stackplane communication link associated with the particular bank. Each channel bank's DS0 MUX, TSI and local processor are accordingly interfaced to the SPI block, which provides the overall functionality associated with the NI interfaces. In addition, various memory structures (data memory, control memory, et cetera) are provided for operating in conjunction with the switching services of the bank.

Essentially, the SPI block is operable to provide a bi-directional serialization/deserialization functionality coupled with interleaving, so as to effectuate a high-speed interbank communication link that comprises an upstream data path, a downstream data path and a bi-directional timing/control path which will be described in additional detail hereinbelow. Preferably, the interbank communication carried on SP link is based on SONET technology, but without any standards-based external interfaces to the users. Thus, the SP link is a purely internal communication link for transporting all interbank traffic (data, timing synchronization, control, IPC, internal protocol encapsulation, et cetera). From this perspective, the stackplane of an access node can be viewed as a concatenation of point-to-point, full duplex serial bus segments, running at speeds in the range of up to a few Gigabits/second. In a presently preferred exemplary embodiment of the present invention, the SP traffic carrier format is based on SONET framing that is suitably modified in accordance with the teachings set forth in the co-pending patent application entitled "Scalable Architecture For An Access Node;" filed Jun. 27, 2002, Ser. No.: 10/184,386, incorporated by reference hereinabove. The modified SONET format (hereinafter referred to as SONET-compliant or SONET-compatible carrier format) is operable for appropriately mapping the diverse traffic information into SONET frame payload (i.e., SPE), wherein the SONET overhead portion is utilized for SP link control and monitoring. Accordingly, although standards-compatible framing is used for the interbank traffic, it should be appreciated that it is the modified SONET (i.e., "pseudo-SONET" or SONET-compatible) frames that actually carry the traffic.

Various traffic types can be combined into serial data for egress transport (i.e., to another channel bank, either in the North or South directions). Upon receipt, the serialized data is deserialized for local switching or multiplexed again for further transport. In one exemplary embodiment, the data channels of the local SP link are operable to carry multiple types of data, e.g., TDM and ATM data, in addition to other types. In one implementation, up to a total of 32 data channels may be interleaved. The interleaved data is serialized (or, deserialized in the opposite direction) by a serializer/deserializer to generate serialized data. Overhead associated with serialization may also be included in the serialized data.

In one exemplary implementation, 12 STS-1 signals are utilized to carry TDM data, giving rise to a rate of 594 Mb/s that can be mapped to 8,064 DS0 channels. In another configuration, 20 STS-1 signals are used for carrying ATM data. Thus, the resultant bandwidth rate of 990 Mb/s can be used transport about 1.9 million ATM cells per second. Also included in the interbank stackplane link is an IPC bus operable to carry interbank HDLC communications. In an exemplary embodiment, the IPC bus is implemented as a 4 Mbps shared bus, with a hardware anti-collision scheme and a round-robin based bandwidth allocation methodology. Preferably, the SPI block in each bank is operable to terminate the local IPC buses and extend the local IPC bus to enable the interbank processor messaging. Interbank timing, synchronization and control information is transported via a separate timing/control channel of the SP link. The system timing is distributed from the primary channel bank, where preferably two redundant reference clocks reside, to the secondary channel banks. As will be described below in additional detail, the interbank synchronization of timing and frame alignment control provided in accordance with the teachings herein obviates the need for extensive data storage (i.e., buffering the frames so as to ensure proper alignment in time necessary for error-free switching) required to support error-free DS0 switching functionality of the banks. Moreover, the delays are also substantially minimized, while accounting for any variations due to interbank cable lengths, etc.

Figure 7:
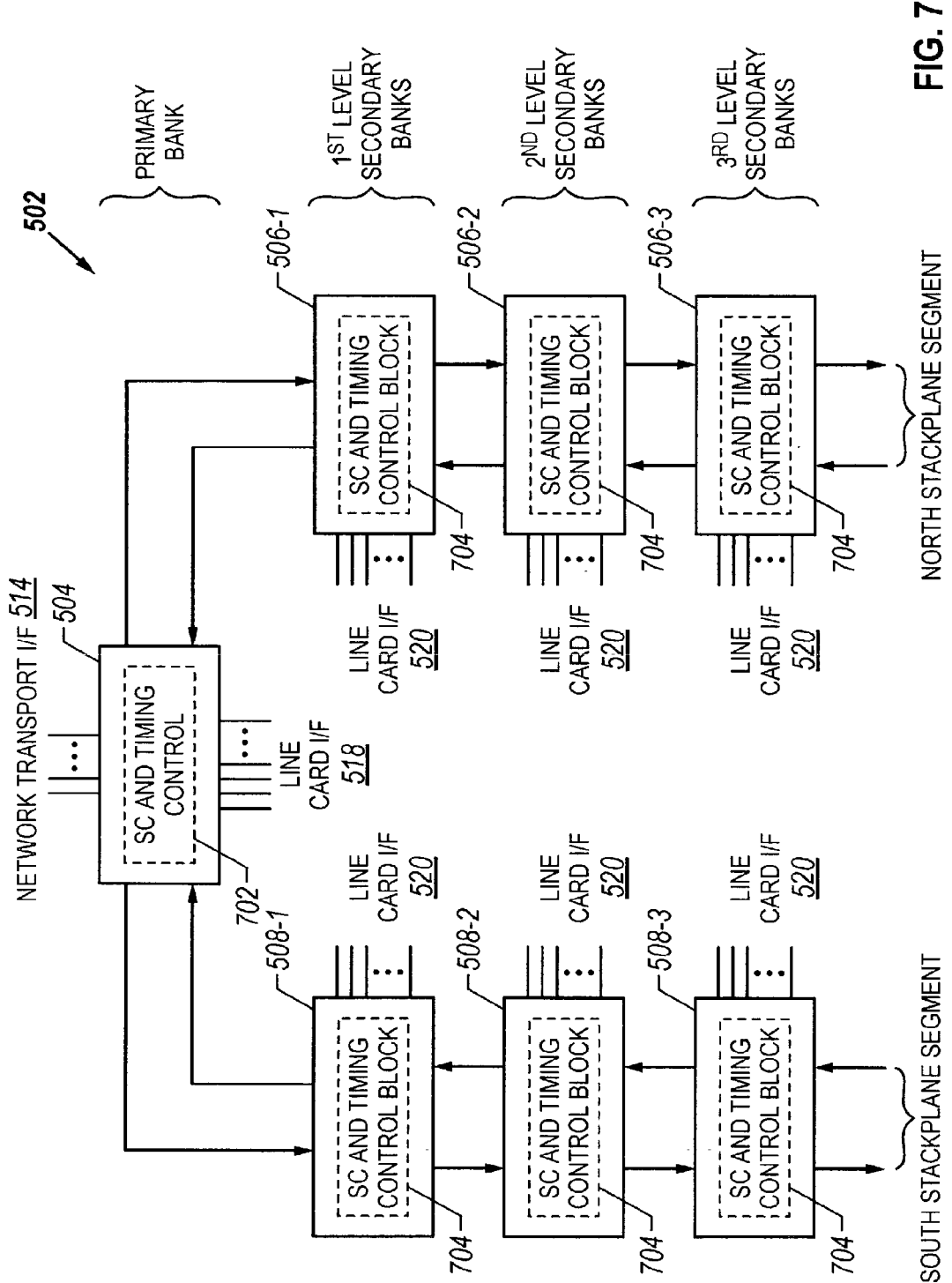
FIG. 7 depicts another view of the exemplary access node terminal illustrating the interbank clock synchronization functionality provided in accordance with the teachings of the present invention.

Referring now to FIG. 7, shown therein is another view of the exemplary access network element or node 502 illustrating the interbank clock/frame alignment synchronization functionality provided in accordance with one exemplary implementation of the present invention. It should be readily recognized by one of ordinary skill in the art that the arrangement shown in FIG. 7 is essentially topologically similar to the linear stack arrangement illustrated in FIG. 5 or FIG. 6, except that the North and South stackplane segments have been arranged below the primary bank 504 in order to demonstrate a common interbank hierarchy that will be useful in describing the present invention's clock/alignment synchronization scheme. Thus, one or two first level secondary banks (reference numerals 506-1 and 508-1) are provided below and immediately coupled to the primary bank 504. In turn, each first level secondary bank is coupled to a second level secondary bank immediately below it. Likewise, additional secondary banks may be hierarchically provided on the South segment, North segment or both segments of the stackplane, depending on the requirements of a particular implementation of the access node 502.

In accordance with the teachings of the present invention, the XCF functionality and associated timing control mechanism of the primary bank 504 provides a centralized timing reference scheme whereby the remaining banks synchronize themselves successively by means of interbank timing feedback loops. Reference numeral 702 refers to the central SC and timing control block provided as part of the primary bank 504, which control block may be implemented with redundancy. Each secondary bank is provided with a local SC and timing control block 704 (also implementable with redundancy) that is operable to: (i) synchronize itself with respect to the bank immediately above it (in slave mode functionality); and (ii) provide a reference timing signal to the bank immediately below it for interbank synchronization (in local master mode functionality).

Figure 8:
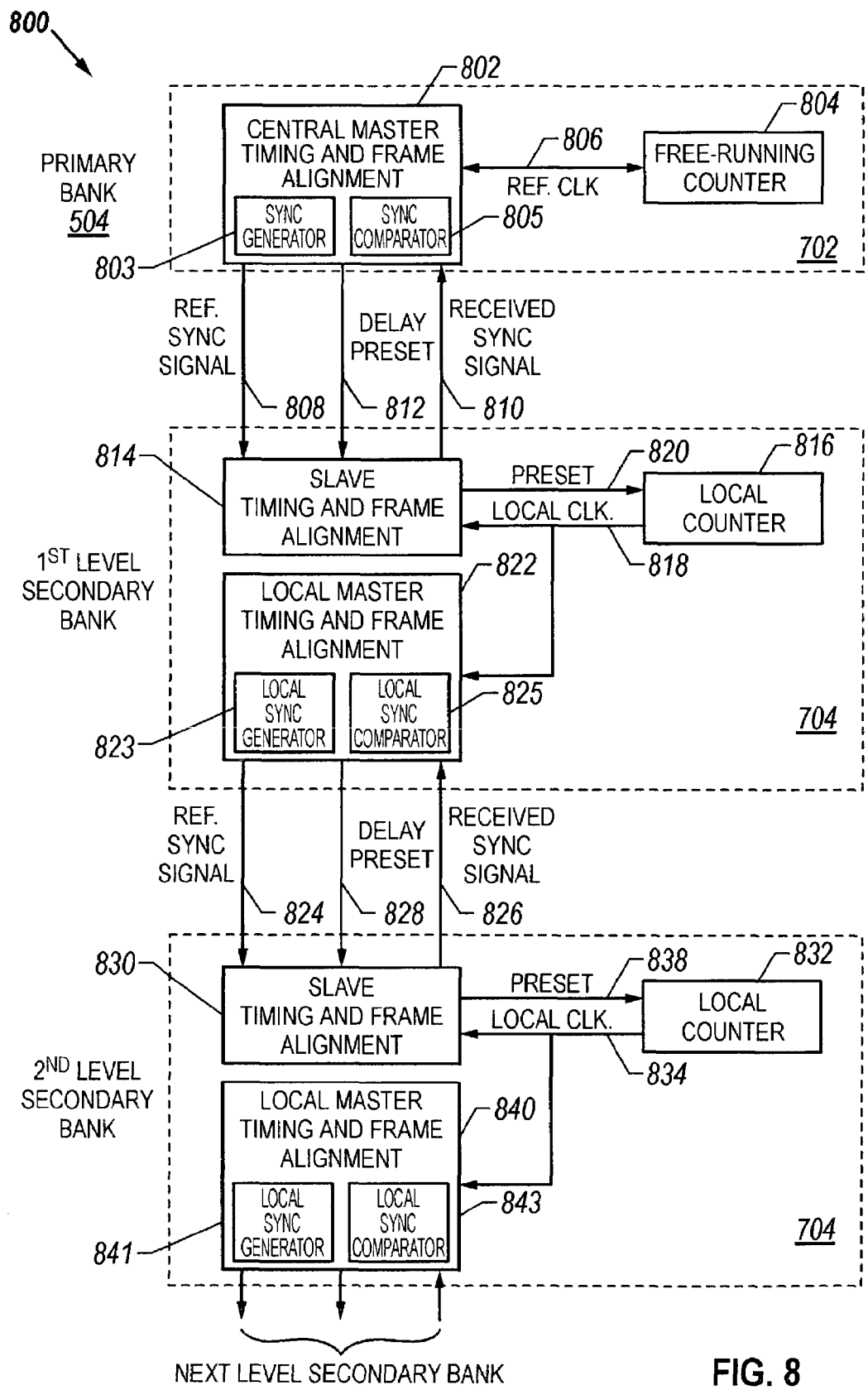
FIG. 8 depicts a functional block diagram of the clock synchronization system of the present invention.

FIG. 8 depicts a functional block diagram of a portion of the access node element 502 illustrating an exemplary embodiment of the interbank clock synchronization system 800 of the present invention. Reference numeral 702 refers to the primary bank's SC and timing control block which includes a central master timing and frame alignment control block 802 operable responsive to a master reference clock 806 provided by a master clock source. Preferably, a free-running counter 804 is operable as a node timing reference for providing the master reference clock. Although not particularly shown, it should be understood by one of ordinary skill in the art that the access network element's node timing reference may also involve the functionality for deriving a time base from a transport network coupled to the primary bank (e.g., T1/E1, SONET, et cetera). Also, a building integrated timing supply (BITS) input may be operable as part of the node timing reference.

A reference synchronization control signal (SYNC) is operable to be generated by a SYNC generator 503 associated with the central master timing/frame alignment control block 802. The reference SYNC signal is operable to be embedded in the timing channel of the SONET-compliant carrier that is transported on the stackplane-based interbank communication link described hereinabove. Reference numeral 808 refers to the reference SYNC signal provided to the first level secondary bank (in North segment, in South segment, or in both segments). A slave timing and frame alignment control block 814 of the first level secondary bank is operable to generate a response SYNC signal 810 that is transmitted back to the central master 802 in the primary bank via the timing channel of the interbank SONET-compliant carrier. A SYNC comparator 805 associated with the primary bank's central master 802 is operable to determine the timing loop's delay (which can be dependent on such factors as cable length, etc.) with respect to the first level secondary bank. This delay information is indicative of the number of time slots by which the frames in the first level secondary bank must be adjusted with respect to the frames in the primary bank so that they are all aligned in time for proper switching. The central master 802 is operable to embed the delay information as a delay preset in the egress timing channel 812 towards the first level secondary bank.

The delay preset information received by the first level secondary bank is provided to a local counter 816 via a delay preset signal path 820, which local counter is operable to adjust its local clock output based thereon. The adjusted local clock 818 is provided to the slave timing/frame alignment block 814 to ensure that appropriate clock adjustment has been made by the local counter 816. A local master timing/frame alignment control block 822 of the first level secondary bank is operable responsive to the adjusted local clock 818 in order to synchronize the secondary bank or banks coupled immediately below it (i.e., second level secondary banks) much in the same manner as the central master's functionality with respect to the first level bank. Accordingly, a local SYNC generator 823 and local SYNC comparator 825 are operable to determine a delay preset as between the first and second level secondary banks. Again, this delay information is indicative of the number of time slots by which the frames in the second level secondary bank must be adjusted with respect to the frames in the first level secondary bank (which is already aligned to the primary bank) so that they are all aligned in time for proper switching.

A local reference SYNC signal 824 is generated towards a slave timing/frame alignment block 830 of the second level secondary bank, which signal is embedded in the lower-level-bound egress timing channel. A response SYNC signal 826 is generated thereafter by the slave timing/frame alignment block 830, which signal is embedded in the upper-level-bound egress timing channel. The local master timing/frame alignment block 822 determines interbank delay based on the reference SYNC signal 824 and response SYNC signal 826 received from the second level secondary bank. A delay preset 828 is then transmitted to the second level secondary bank for adjusting its local clock 834 generated by its local counter 832, which is operable to receive the delay preset information via a preset signal path 838. A local master timing/frame alignment control block 840 including a local SYNC generator 841 and local SYNC comparator 843 is operable responsive to the adjusted local clock 834 in order to control the synchronization process with respect to the next level secondary bank immediately below.

Figure 9:
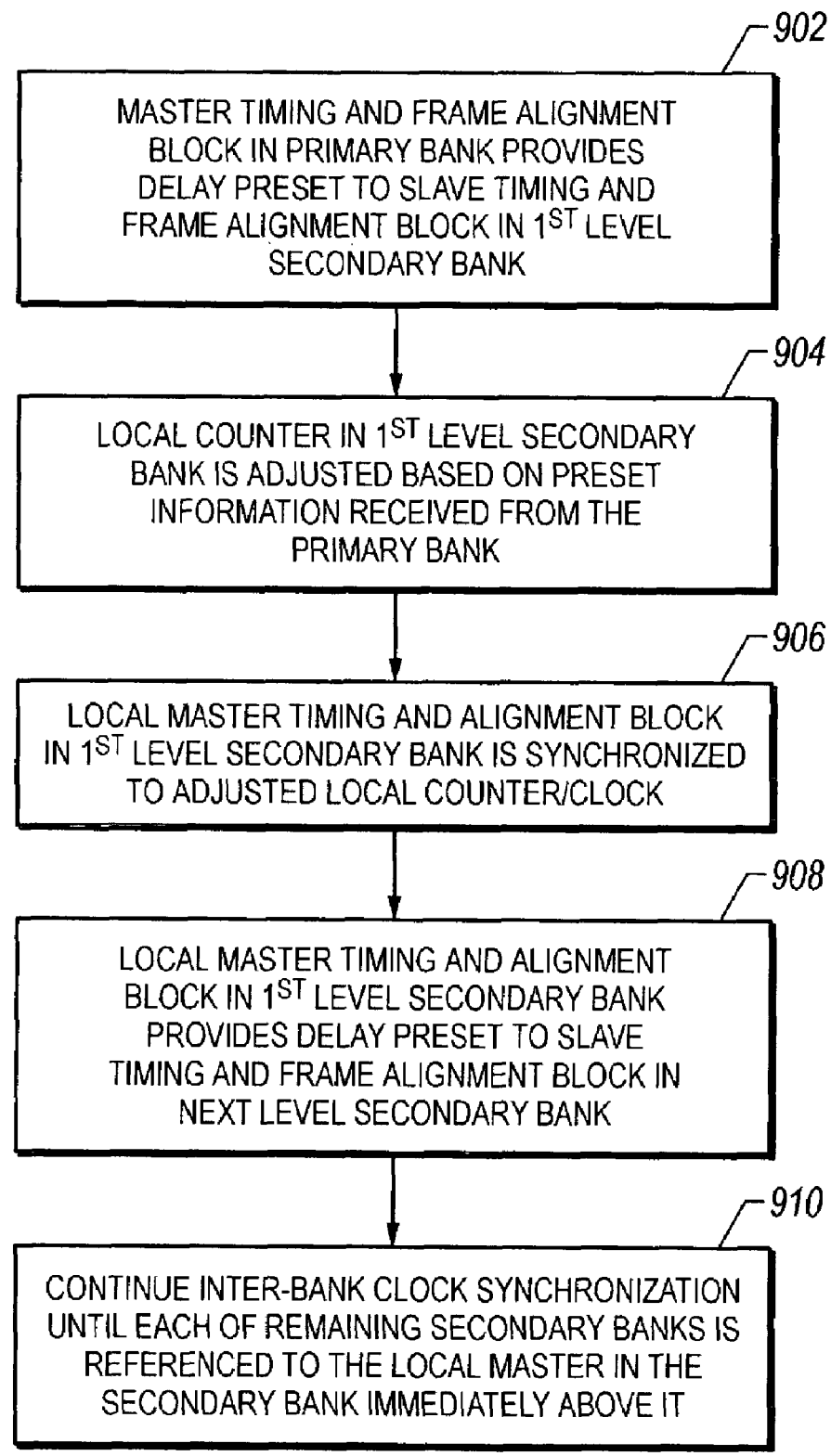
FIG. 9 is a flow chart of the various steps involved in an exemplary methodology for synchronizing interbank clocks in an access node in accordance with the teachings of the present invention.

FIG. 9 is a flow chart of the various steps involved in an exemplary methodology of synchronizing interbank clocks in an access node, e.g., the access network element 502 described above, in accordance with the teachings of the present invention. As set forth in the foregoing description, a central master timing/frame alignment control block of the access node's primary bank provides a delay preset to a slave timing/frame alignment control block in a first level secondary bank (step 902). A local counter in the first level secondary bank is adjusted based on the preset information received from the primary bank (step 904). A local master in the first level secondary bank is also synchronized to the adjusted local clock/counter (step 906). Thereafter, the local master in the first level secondary bank provides a delay preset to a slave timing/frame alignment control block of the next level secondary bank disposed immediately below it (step 908). This bank-by-bank synchronization process continues until each of the remaining secondary banks is referenced to the local master in the secondary bank immediately above it (step 910), all of which are ultimately referenced relatively to the central master block of the primary bank.

Based upon the foregoing Detailed Description, it should be appreciated that the present invention advantageously provides an innovative clock/frame alignment mechanism for use with an access node architecture that affords efficient scalability. The internal stackplane hierarchy supports a linear chain of inter-connected banks that can be concatenated with minimal effort and downtime, thereby allowing a network operator to incrementally add extra infrastructure. Interbank stackplane links can be effectuated either on copper wire media for shorter distances (less than about 10 meters) or by using a fiber. By implementing dedicated channels for framing, fault detection, alarms, diagnostics, addressing, data type identification, and activity status, a robust high-speed communication link is provided for transporting interbank traffic. By providing relative synchronization (i.e., bank-by-bank synchronization), the memory requirements for storing the data frames waiting to be switched at appropriate times is minimized. Relatedly, the delay times internal to the node are also minimized, as the need for storing the frames for longer times in order to properly align them for switching is reduced. Further, the scalability of the alignment scheme of the present invention affords a robust timing architecture even as more secondary banks are added and the physical distance between the newly-added banks and the primary bank keeps growing. This feature is particularly advantageous as the interbank cable lengths can be variable and introduce additional delays.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A clock synchronization system for use in an access network element having a primary bank and a plurality of secondary banks interlinked via an interbank communication link, comprising:
    a central master timing and frame alignment control block disposed in said primary bank, said central master timing and frame alignment control block operating based on a master reference clock to determine a delay preset with respect to a slave timing and frame alignment control block disposed in a first level secondary bank coupled to said primary bank;
    a local counter coupled to said slave timing and frame alignment control block disposed in said first level secondary bank, wherein said local counter is operable to generate an adjusted local clock based on said delay preset received from said central master timing and frame alignment control block; and
    a local master timing and frame alignment control block disposed in said first level secondary bank, said local master timing and frame alignment control block operating responsive to said adjusted local clock to determine a delay preset with respect to a slave timing and frame alignment control block disposed in an adjacent secondary bank immediately below said first level secondary bank, wherein a local counter coupled to said slave timing and frame alignment control block disposed in said adjacent secondary bank is operable to generate an adjusted local clock based on said delay preset received from said first level secondary bank.

2. The clock synchronization system as set forth in claim 1, wherein said master reference clock is generated based on a free-running counter disposed in said primary bank.

3. The clock synchronization system as set forth in claim 1, wherein said master reference clock is provided by a node timing reference associated with said access network element.

4. The clock synchronization system as set forth in claim 3, wherein said node timing reference is derived from a transport network coupled to said primary bank.

5. The clock synchronization system as set forth in claim 3, wherein said node timing reference is derived from a building integrated timing supply (BITS) input.

6. The clock synchronization system as set forth in claim 1, wherein said delay preset provided by said central master timing and frame alignment control block is embedded in a Synchronous Optical Network (SONET)-compatible carrier associated with said interbank communication link disposed between said primary bank and said first level secondary bank.

7. The clock synchronization system as set forth in claim 6, wherein said central master timing and frame alignment control block includes:
   means to generate a reference SYNC signal directed to said slave timing and frame alignment control block disposed in said first level secondary bank; and
   means to compare said reference SYNC signal with a received SYNC signal generated by said slave timing and frame alignment control block towards said primary slave timing and frame alignment control block.

8. The clock synchronization system as set forth in claim 7, wherein said SONET-compatible carrier is operable at around 2.5 Gigabit/second.

9. The clock synchronization system as set forth in claim 7, wherein said SONET-compatible carrier includes a Time-Division Multiplex (TDM) data channel.

10. The clock synchronization system as set forth in claim 7, wherein said SONET-compatible carrier includes an Asynchronous Transfer Mode (ATM) data channel.

11. A clock synchronization method for use in an access network element having a primary bank and a plurality of secondary banks interlinked via an interbank communication link, comprising the steps:
   providing a delay preset by a central master timing and frame alignment control block disposed in said primary bank to a slave timing and frame alignment control block disposed in a first level secondary bank coupled to said primary bank;
   adjusting a local clock generated by a local counter that is coupled to said slave timing and frame alignment control block disposed in said first level secondary bank, wherein said local clock is operable to be adjusted based on said delay preset received from said central master timing and frame alignment control block;
   synchronizing a local master timing and frame alignment control block disposed in said first level secondary bank based on said adjusted local clock; and
   providing a delay preset by said local master timing and frame alignment control block operating responsive to said adjusted local clock to a slave timing and frame alignment control block disposed in an adjacent secondary bank immediately below said first level secondary bank, wherein a local counter coupled to said slave timing and frame alignment control block disposed in said adjacent secondary bank is operable to generate an adjusted local clock based on said delay preset received from said first level secondary bank, said adjusted local clock in said adjacent secondary bank operating to synchronize a local master timing and frame alignment control block disposed therein.

12. The clock synchronization method as set forth in claim 11, further comprising the step of continuing to synchronize each of remaining secondary banks with reference to a local master timing and frame alignment control block disposed in an adjacent secondary block immediately above it.

13. The clock synchronization method as set forth in claim 11, wherein said step of providing a delay preset by said central master timing and frame alignment control block further comprises the steps of:
   generating, responsive to a master reference clock associated with said primary bank, a reference SYNC signal by said central master timing and frame alignment control block;
   transmitting said reference SYNC signal to said slave timing and frame alignment control block disposed in said first level secondary bank;
   generating, responsive to said reference SYNC signal, a response SYNC signal by said slave timing and frame alignment control block;
   transmitting said response SYNC signal to said central master timing and frame alignment control block;
   determining said delay preset based on comparing said reference and response SYNC signals by said central master timing and frame alignment control block; and
   transmitting said delay preset to said slave timing and frame alignment control block disposed in said first level secondary bank in a Synchronous Optical Network (SONET)-compatible carrier associated with said interbank communication link disposed between said primary bank and said first level secondary bank.

14. The clock synchronization method as set forth in claim 13, wherein said step of providing a delay preset by said local master timing and frame alignment to a slave timing and frame alignment control block disposed in said adjacent secondary bank further comprises the steps of:
   generating, responsive to said adjusted local clock of said first level secondary bank, a reference SYNC signal by said local master timing and frame alignment control block;
   transmitting said reference SYNC signal to said slave timing and frame alignment control block disposed in said adjacent secondary bank;
   generating, responsive to said reference SYNC signal transmitted by said local master timing and frame alignment control block, a response SYNC signal by said slave timing and frame alignment control block in said adjacent secondary bank;
   transmitting said response SYNC signal to said local master timing and frame alignment control block in said first level secondary bank;
   determining said delay preset based on comparing said reference and response SYNC signals by said local master timing and frame alignment control block; and
   transmitting said delay preset to said slave timing and frame alignment control block disposed in said adjacent secondary bank in a SONET-compatible carrier associated with said interbank communication link disposed between said first level secondary bank and said adjacent secondary bank.

15. The clock synchronization method as set forth in claim 14, wherein said master reference clock is provided by a free-running counter.

16. The clock synchronization method as set forth in claim 14, wherein said master reference clock is provided by a node timing reference associated with said access network element.

17. The clock synchronization method as set forth in claim 16, wherein said node timing reference is derived from a transport network coupled to said primary bank.

18. The clock synchronization method as set forth in claim 16, wherein said node timing reference is derived from a building integrated timing supply (BITS) input.

* * * * *